June 29, 1965　　　O. R. POLLARD　　　3,191,747
CONVEYOR AND DISPATCH DEVICE
Filed April 3, 1963　　　　　　　　　　　　3 Sheets-Sheet 1
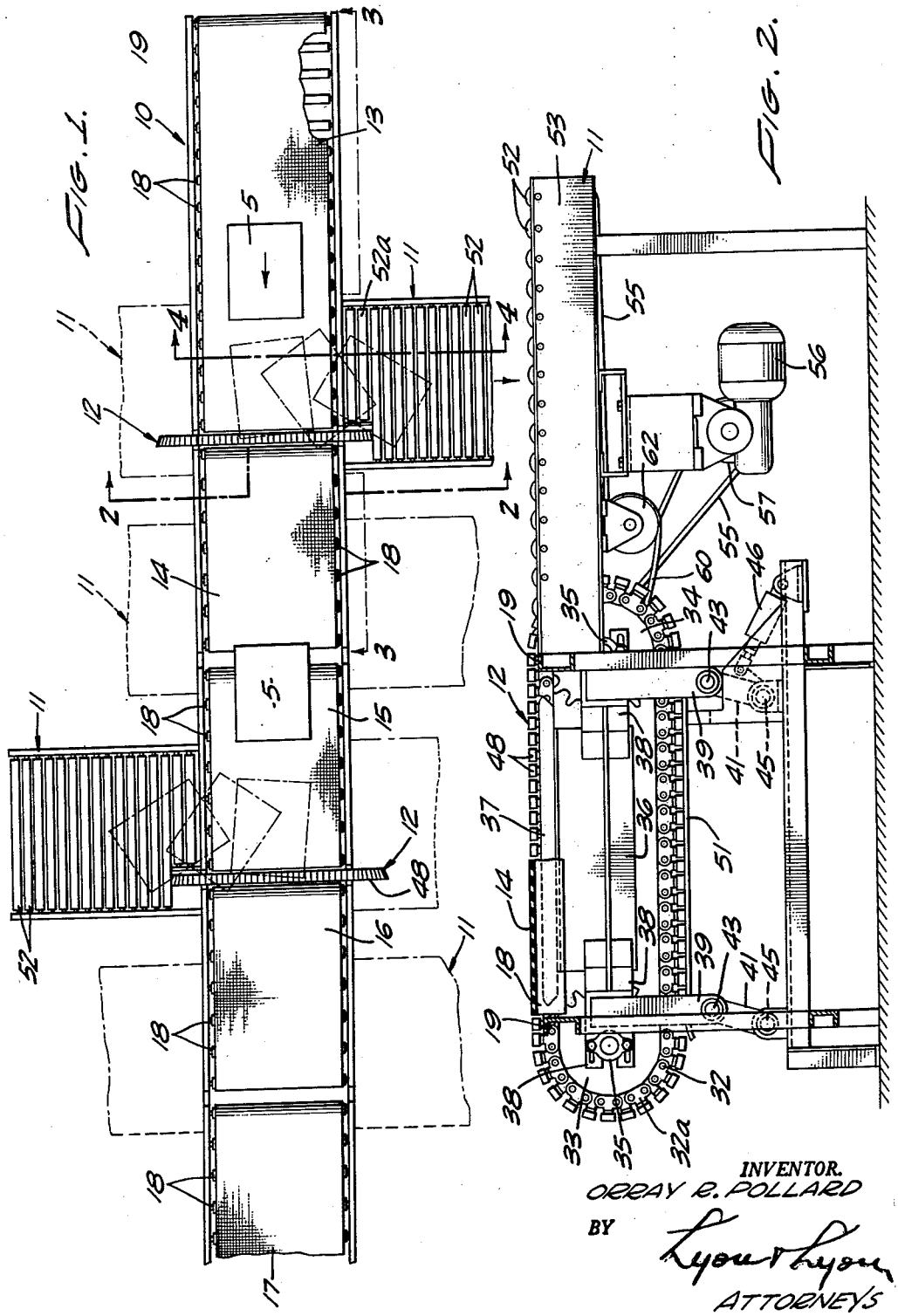
INVENTOR.
ORRAY R. POLLARD
BY
ATTORNEYS

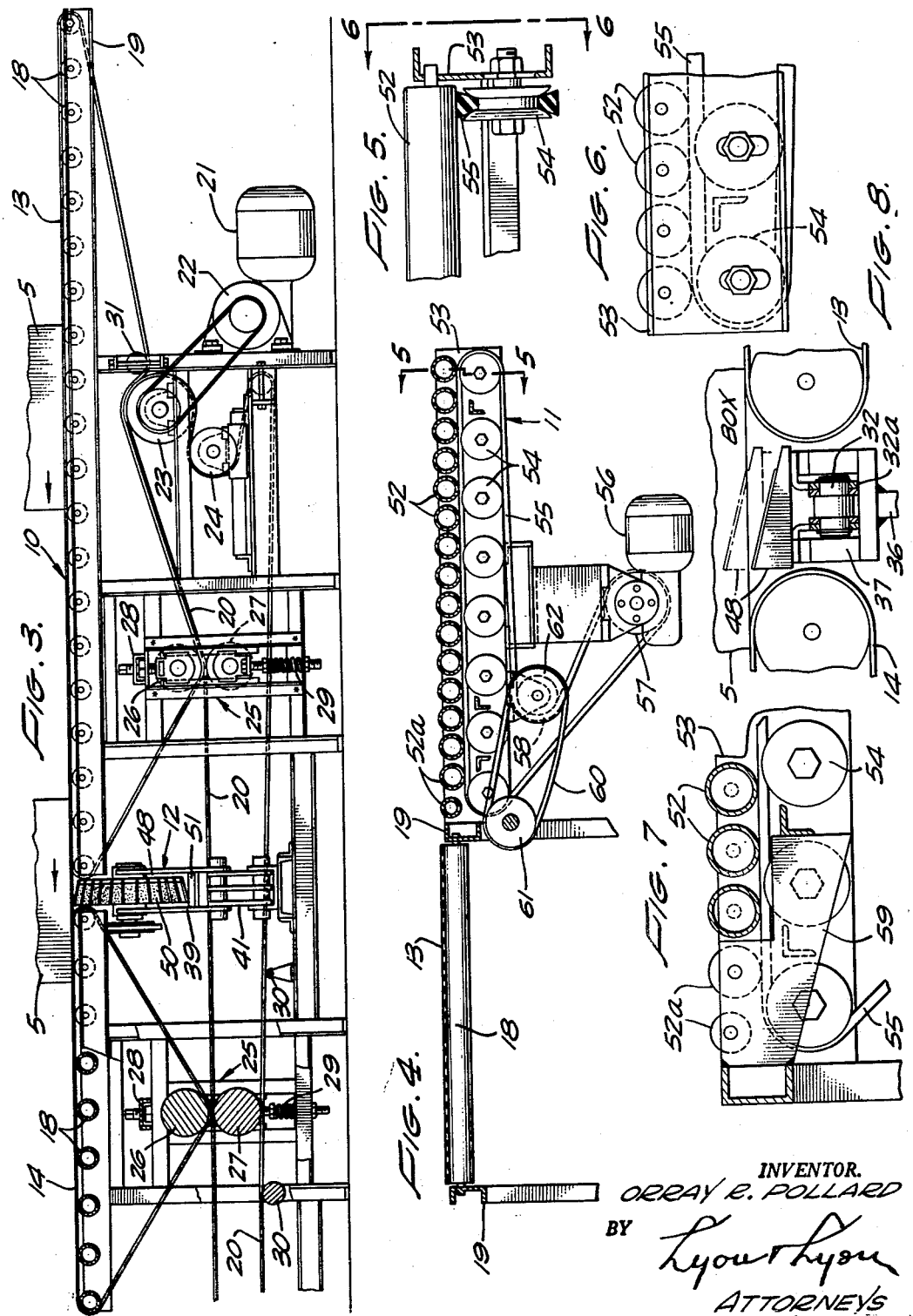

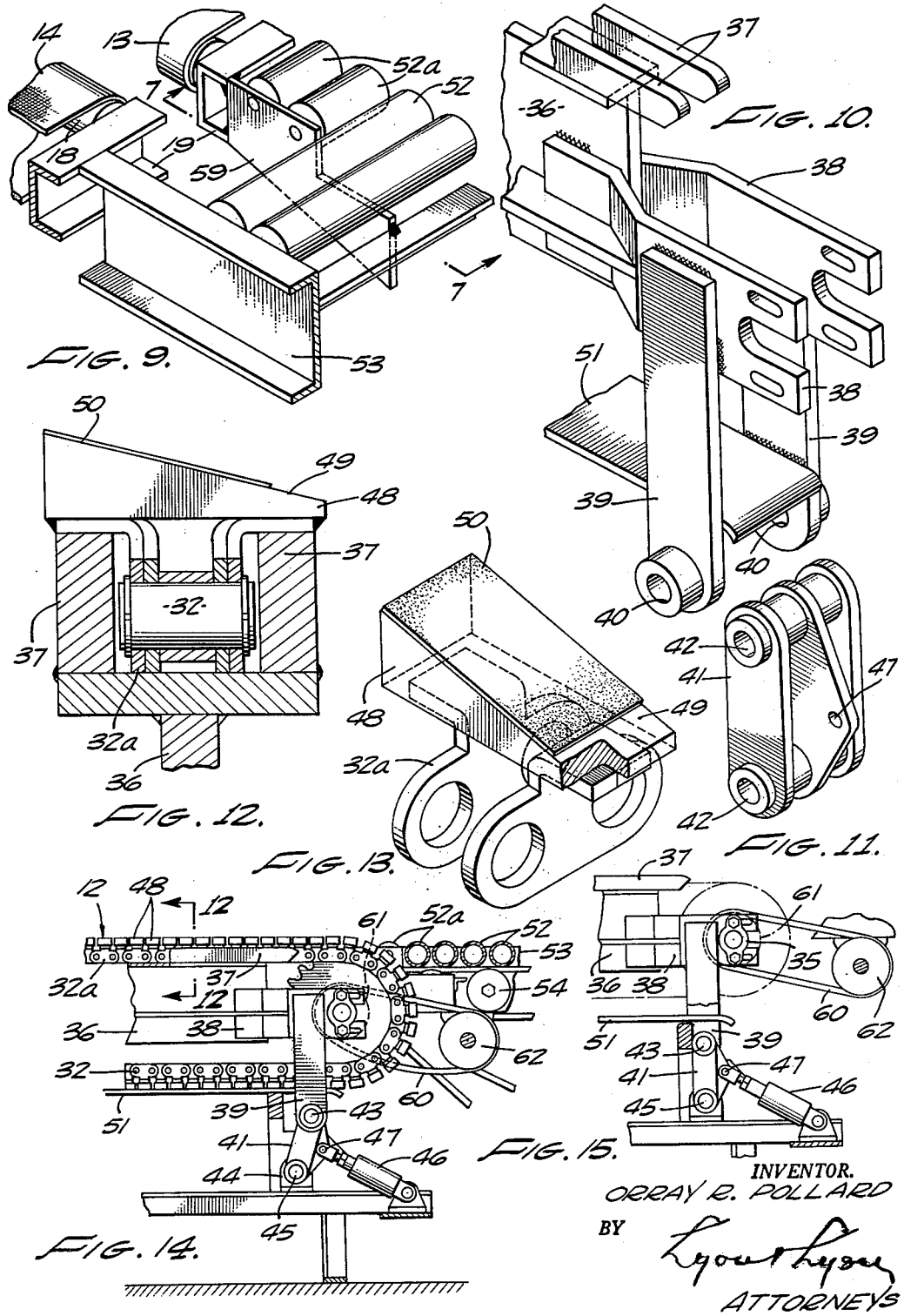

United States Patent Office

3,191,747
Patented June 29, 1965

3,191,747
CONVEYOR AND DISPATCH DEVICE
Orray R. Pollard, South San Gabriel, Calif., assignor to A. J. Bayer Company, Los Angeles, Calif., a corporation of California
Filed Apr. 3, 1963, Ser. No. 270,441
17 Claims. (Cl. 198—20)

This invention relates to a conveyor arrangement for handling packages and other objects and laterally dispatching such packages or objects from a first conveyor to a second conveyor or other type of receiving means. In particular, this invention is directed to such a conveyor arrangement wherein the means for accomplishing lateral dispatch may be used with a said first conveyor of the type having a moving surface for supporting and transporting the packages or objects such as power-driven belt conveyors.

There are numerous conventional installations of conveyor systems wherein a vairety of miscellaneous packages and objects are placed on a main conveyor and these packages and objects are removed at various selected stations along the main conveyor to thereby sort the packages and objects into desired catagories for inspection, shipping, packaging, or other operations. The removal of the packages or objects from the main conveyor at appropriate stations is accomplished by mechanical devices in more conventional modern installations. In conveyor installations employing such mechanical removal devices, numerous systems and devices have been developed for permitting a single operator positioned at the beginning of the main conveyor to identify, select and record the particular station where that package or object is to be removed from the main conveyor. The mechanical device at that station is then actuated automatically at the appropriate time for removing that package or object. Such systems and devices are obviously beneficial in that they eliminate the need for an individual operator at each station to continually observe the main conveyor and then to actuate the mechanical device for removing the appropriate packages and objects from the main conveyor at that station.

Many of these systems and devices, whereby a single operator can designate that a particular package or object is to be removed at a subsequent station along the main conveyor, require that the linear advancement of the packages or objects along the conveyor be consistent and accurately predictable. For example, many systems employ means whereby the operator records which station the package in front of him is to be removed and after a predetermined lapse of time based on the rate of advancement of the conveyor and the distance to that station, the mechanical device at that station is actuated to remove that package or object. However, with conventional powered roller type conveyors employing individual spaced rollers that are rotated to cause advancement of a package or object supported by the rollers, the rate of linear advancement of the package or object along the conveyor is not always consistent or predictable. This is, in part, due to the differences in configuration of various packages and objects and, in particular, the supporting surface of such packages and objects. As is well known to those skilled in the art, a package or object having an irregular supporting surface will tend to travel at an erratic rate of linear advancement along a powered roller conveyor.

However, with conventional belt conveyors or apron type conveyors which have individual platforms or aprons mounted on a continuous roller chain to define a conveying surface, the rate of linear advancement of the packages or objects is consistent and substantially identical to the rate of advancement of such a conveyor.

Thus, with these types of conveyors the systems and devices that employ a single operator for recognizing and recording which station a particular package or object is to be removed may be used effectively since the rate of travel of the package or object to that station is consistent and predictable. However, with these types of conveyors it has been necessary and conventional that the mechanical devices for removing the package or object operate above the surface of the main conveyor, as for example, the "pusher" type or "deflector" type dispatch devices. In contrast, there have been numerous devices employed for discharging packages or objects laterally from a powered roller conveyor wherein means positioned between the powered rollers may be actuated to cause the lateral movement. However, since these means must be positioned between powered rollers and be movable upwardly to engage the package or object, they are not adaptable for use with belt or apron type conveyors.

Furthermore, all heretofore conventional mechanical means for removing a package or object at a particular station generally employed one of two general principles for removing the package or object. One principle is to move the package directly laterally such as is accomplished by a pusher type device and the other principle is to gradually guide the package off the main conveyor such as with a deflector or wheels positioned at an angle to the direction of movement of the main conveyor. When using devices employing the first principle, there must be ample spacing between packages and objects on the main conveyor to permit the lateral movement of the package or object and return of the pusher without interfering with the next package or objects, and thus the unit capacity of the main conveyor per unit of time is limited. With the devices employing the second principle, the removal of the packages and objects is relatively gradual and as a result the spacing between the stations is relatively large thereby limiting the number of stations that may be provided for a given length of the main conveyor. Devices employing this second principle also require ample spacing between packages or objects. Furthermore, many of these removable devices, employing either of these principles, are only operable and adaptable for removing a package or object in one direction from the main conveyor.

Accordingly, by this invention there is provided a main conveyor and a device for laterally dispatching packages or objects from the main conveyor in which only a narrow lateral space in the conveying surface of the main conveyor is required for accommodating the dispatching means and, therefore, the main conveyor may be of a belt type as is desirable for remote timing of the lateral dispatch.

An object of this invention is to provide a novel form of lateral dispatch means that is usable with a belt type conveyor and is not positioned above the conveying surface of such belt conveyor.

Another object of this invention is to provide a novel form of lateral dispatch means for use with a conveyor wherein virtually any package or object regardless of size or configuration is readily dispatched from the main conveyor.

A further object of this invention is to provide a lateral dispatch arrangement for a main conveyor wherein a very minimum of spacing between packages and objects on the main conveyor is required and a very minimum spacing along the main conveyor between successive lateral dispatch arrangements is required.

Still another object of this invention is to provide such a lateral dispatch arrangement that is capable of dispatching packages from the main conveyor in either lateral direction.

A still further object of this invention is to provide a lateral dispatch arrangement for a main conveyor wherein means frictionally engage the under surface of the leading portion of a package or object travelling on the main conveyor while permitting the trailing portion of the package or object to continue to travel along the main conveyor thus turning the package or object whereby other packages and objects may be closely spaced from the package to be removed and will not be interfered with by such removal.

Another object of this invention is to provide dispatch means for a main conveyor that will operate satisfactorily and efficiently to remove a package or object from the main conveyor even though at that particular dispatch station there is a substantial discrepancy between the actual position of the package or object and the position that should have occurred by normal movement of the package or object along the main conveyor.

Still a further object of this invention is to provide an arrangement for synchronously driving a plurality of individual belt conveyors positioned end to end to form a main conveyor having lateral spaces in the supporting and conveying surface thereof whereby lateral dispatch means may be provided in such lateral spaces.

Other and more detailed objects and advantages of this invention will appear from the following description and the accompanying drawings.

In the drawings:

FIGURE 1 is a plan view of an embodiment of the package conveyor and lateral dispatch arrangement of this invention with a plurality of dispatch stations indicated.

FIGURE 2 is a sectional elevation of the lateral dispatch means of this invention taken substantially on the line 2—2 shown in FIGURE 1.

FIGURE 3 is a longitudinal sectional elevation of the main conveyor and drive arrangement of this invention taken substantially on the line 3—3 shown in FIGURE 1.

FIGURE 4 is a sectional elevational of a power driven roller conveyor which may be located at a dispatch station and is taken substantially on the line 4—4 shown in FIGURE 1.

FIGURE 5 is a fragmentary sectional elevation taken substantially on the line 5—5 shown in FIGURE 4.

FIGURE 6 is a fragmentary sectional elevation taken substantially on the line 6—6 shown in FIGURE 5.

FIGURE 7 is an enlarged fragmentary elevation of a portion of the power driven roller conveyor shown in FIGURE 4 and is taken substantially on the line 7—7 shown in FIGURE 9.

FIGURE 8 is a fragmentary elevation view of a portion of the lateral dispatch means of this invention illustrating the two positions of such means with respect to the conveying surface of the main conveyor.

FIGURE 9 is a perspective view of a portion of the power driven roller conveyor illustrated in FIGURE 4.

FIGURE 10 is a perspective view of one of the supporting components for the lateral dispatch means with many of the components removed for clarity of illustration.

FIGURE 11 is a perspective view of another of the components employed in the lateral dispatch means.

FIGURE 12 is an enlarged sectional elevation of the link and guide means of the chain of the lateral dispatch means and is taken substantially on line 12—12 shown in FIGURE 14.

FIGURE 13 is a perspective view of one of the links of the chain of the lateral dispatch means.

FIGURE 14 is a sectional elevation of the lateral dispatch means in a lowered position for allowing a package to pass this dispatch station.

FIGURE 15 is a fragmentary view similar to FIGURE 14 but illustrating the lateral dispatch means in the elevated position for engaging and removing a package or object from the main conveyor.

Referring now more particularly to FIGURE 1, there is shown a portion of a typical conveyor and lateral dispatch arrangement employing this invention with the main conveyor being generally designated 10 and the lateral conveyors each being generally designated 11. Certain of the lateral conveyors 11 are shown in phantom lines for simplicity of illustration and it is to be noted that a pair of lateral conveyors 11 may be positioned on either side of the main conveyor 10 at each dispatch station. However, it will readily appear that it is not essential to the operation of one lateral conveyor 11 that another lateral conveyor 11 be positioned on the opposite side of the main conveyor 10. A lateral dispatch device, generally designated 12 and the operation of which is hereinafter described, is located at each dispatch station and extends laterally across the main conveyor 10.

In order to accommodate the dispatch device 12, the main conveyor 10 must be discontinuous at each dispatch device 12, that is to say, there must be a narrow space laterally across the conveying surface of the main conveyor 10. If a powered roller type conveyor were employed for main conveyor 10, then this narrow space would be provided by merely longitudinally separating two adjacent powered rollers the needed distance. With a belt type main conveyor 10, as is shown in the drawings, the conveying surface of the belt is discontinuous for a short longitudinal distance at each dispatch device 12. Although not shown it will readily appear that this may be accomplished by using a single continuous belt for the main conveyor 10 with appropriate rollers and idler rollers positioned at each dispatch device 12 for causing the conveying portion of the continuous belt to turn downwardly below the dispatch device 12 and then return to the conveying surface level on the opposite side of the dispatch device 12. As an alternative to this arrangement a plurality of individual continuous belts 13, 14, 15, 16 and 17, as shown in the drawings, may be employed with each individual belt being driven at the same rate of linear advancement and each individual belt being longitudinally spaced from the next adjacent belt the necessary distance for providing the space for accommodating the dispatch devices 12. By either of these belt conveyor arrangements it may be seen that a conveying surface is defined for supporting packages and objects that moves at a uniform rate along the length of the main conveyor and yet provides the narrow spaces in the surface of the conveyor that are required for accommodating the dispatch devices 12. The narrow spaces are of such a size that the smallest package to be handled by the conveyor will readily be transported across the space without dropping into the space.

Referring now more particularly to FIGURE 3, the means for operating the main conveyor 10 and synchronously driving the plurality of individual continuous belts 13, 14, 15, 16 and 17 are illustrated. The individual belts 13–17 may be of any conventional material and construction and are formed into individual continuous loops. The upper or conveying portion of each belt 13–17 is supported by a plurality of parallel rollers 18 extending laterally across the conveyor and rotatably mounted on the frame 19 of the main conveyor 10 as is conventional practice with belt conveyors. The conveying surfaces of the individual belts 13–17 are relatively horizontal and aligned with each other. A driving belt 20 is continuous and extends substantially the length of the main conveyor 10. A motor 21, through conventional drive apparatus 22, drives a roller 23 which in turn drives the belt 20 at the desired rate. A take-up roller 24 is employed in the conventional manner for producing the necessary friction between drive belt 20 and roller 23 to drive the belt. A ringer roller assembly, generally designated 25, is associated with each of the individual conveyor belts 13, 14, 15, 16 and 17. Each ringer roller assembly 25 is comprised of a pair of rollers 26 and 27 extending longitudinally across the conveyor and being rotatably mounted. Rollers 26 and 27 are both vertically movable with the upper roller 26 having adjustable means 28 for adjusting roller 26 to the desired vertical location. Lower roller 27 is continually urged upwardly toward engagement with roller 26 by any convenient means such as precompressed springs 29. Each of the belts 13–17 passes through the associated ringer roller assembly 25 between the rollers 26 and 27. The driving belt 20 passes between the rollers 26 and 27 of each ringer roller assembly 25. Thus, the driving belt 20 is in contact with each of the belts 13–17 and since each lower roller 27 is biased upwardly toward roller 26 a frictional engagement between driving belt 20 and each of the belts 13–17 is established whereby belt 20 drives all of the belts 13–17 at the same rate of linear advancement. Support rolls 30 may be provided as desired for supporting the returning or lower portion of drive belt 20. As illustrated in FIGURE 3, the upper portion of drive belt 20 that passes through the ringer roller assembly 25 will be moving from left to right to thereby drive the belts 13–17 such that their upper or package-supporting surfaces are moving from right to left. Since belt 13 will be the loading belt and therefore substantially longer and more heavily loaded than the remaining belts 14–17, an idler roller 31 may be provided for urging belt 13 into frictional engagement with drive belt 20 as drive belt 20 passes over drive roller 23 to thereby produce an even more positive drive of belt 13.

The dispatch device 12 is provided for laterally discharging the package 5 or other object traveling along the main conveyor 10 without stopping conveyor 10 or interferring with other packages on the conveyor. The dispatch device 12 includes a continuous roller chain 32 extending between and operably engaging two sprockets 33 and 34 although it is to be understood, and will readily appear to those skilled in the art, that other types of continuous elements and supporting means may be used such as a V-belt and belt pulleys. The sprockets 33 and 34 are each mounted on a shaft which is in turn rotatably supported by a pair of bearings 35. All of the bearings 35 are adjustably mounted on a rigid frame 36 which extends the width of the conveyor 10. The center distance between sprockets 33 and 34 is preferably greater than the width of the individual belts 13–17 with the center line of each sprocket positioned beyond the lateral extremity of the belts. A trough 37 is mounted on the upper portion of frame 36 and extends horizontally across the main conveyor 10 to support the roller chain 32 as best shown in FIGURE 12.

The frame 36 is provided with a pair of spaced bifurcated brackets 38 on either end for straddling the sprockets 33 and 34 and adjustably supporting the bearings 35 thereon. An arm 39 of frame 36 extends downwardly from each bracket 38. Each pair of arms 39 are spaced and have aligned holes 40 in their lower ends. A support plate 51 may be provided on the lower portion of frame 36 extending between the pairs of arms 39 to support the lower strand of the roller chain 32. A pair of links 41 are provided and each link has a pair of spaced parallel bores 42 therethrough. Each link 41 is pivotally connected to a pair of arms 39 by a pin 43 passing through the holes 40 in arms 39 and one of the bores 42 in that link 41. Each link 41 extends generally downwardly from arms 39 and is pivotally connected to a bracket 44 by means of another pin 45. The brackets 44 are rigidly mounted on the frame of the main conveyor 10 at the same center distance between the brackets as the center distance between holes 40 in the pairs of arms 39. Thus, a parallelogram arrangement is formed whereby lateral movement of frame 36 relative to the frame of main conveyor 10 causes vertical movement of frame 36 while maintaining the trough 37 and the portion of the roller chain 32 that it supports in a substantially horizontal orientation. Means are provided for causing this movement of frame 36 and, as shown in the drawings, these means may be comprised of an air cylinder assembly 46 pivotally connected to the frame of conveyor 10 and pivotally mounted at 47 to one of the links 41. Air cylinder assembly 46 is normally in the position shown in FIGURES 2 and 14 but upon actuation of the air cylinder assembly the frame 36 is moved laterally and elevated to the position shown in FIGURE 15.

The roller chain 32 is provided with conventional mounting links 32a on which are mounted wedge-shaped blocks 48. Wedge-shaped blocks 48 have an upper surface 49 that is tapered upwardly in the direction of travel of the package conveying surface of main conveyor 10. It is preferred that surface 49 be of a friction inducing texture or be covered with a friction material 50 for engaging the bottom surface of packages 5 as hereinafter described. When frame 36 is in the lowered position shown in FIGURES 2 and 14, the upper-most portion of tapered blocks 48 is below the package conveying surface of main conveyor 10, as shown in solid lines in FIGURE 8, whereby a package 5 is permitted to pass from conveyor belt 13 to conveyor belt 14 without being engaged by the blocks 48. When frame 36 is moved to the elevated position shown in FIGURE 15, a portion of blocks 48 extends above the package conveying surface of main conveyor 10, as shown by phantom lines in FIGURE 8, but the lowermost portion of surface 49 remains below the package conveying surface of conveyor 10.

Referring now more particularly to FIGURES 4, 5, 6, 7 and 9, a typical lateral conveyor 11 is shown that may be used with the main conveyor and dispatch device of this invention. While lateral conveyor 11 is shown and hereinafter described as a powered roller type conveyor it is to be understood and will readily appear to those skilled in the art that various other types of conventional conveyors may be used with equal success by merely substituting such other types of conveyors. Conveyor 11 is provided with a plurality of parallel and closely spaced rollers 52 rotatably mounted on a frame 53 in a conventional manner. The upper conveying surface defined by the plurality of rollers 52 is preferably at or slightly below the conveying surface of main conveyor 10. A plurality of V-belt sheaves 54 are rotatably mounted on frame 53 below rollers 52 and a V-belt 55 passes over sheaves 54 between the sheaves and rollers 52 and frictionally engages the rollers 52. V-belt 55 is power driven by a motor 56 through a drive sheave 57 and idler sheave 58. Thus, by means of motor 56 rollers 52 are rotated to cause any package or object positioned thereon to advance along conveyor 11 away from main conveyor 10 in a manner somewhat conventional for powered roller conveyors.

A lateral conveyor 11 is positioned adjacent each dispatch device 12 with a major portion of the width of such lateral conveyor 11 positioned along the main conveyor 10 longitudinally in front of the associated dispatch device 12. That is to say, only a small portion of the width of each lateral conveyor 11 is positioned beyond the associated dispatch device 12 in the direction of travel of the main conveyor as may be seen in FIGURE 1. It is preferred that the roller 52 that is immediately adjacent the main conveyor 10 be positioned as close to the conveyor belts 13, 14, 15, 16 or 17 as possible and since the dispatch device 12 extends beyond the width of these belts it is necessary that one or more of the rollers 52 immediately adjacent the conveyor 10 be foreshortened to accommodate the dispatch device 12. This relationship is clearly shown in FIGURE 9 where rollers 52a are shorter than rollers 52 and supported at one end by a separate bracket 59. The lateral conveyor 11 may be operated continuously or merely intermittently when a package is dispatched to that particular conveyor.

In order to dispatch a package 5 from the main conveyor 10 to a lateral conveyor 11, the associated dispatch device 12 is moved to the elevated position by actuating air cylinder assembly 46 and the roller chain 32 is driven in the proper direction to advance the portion of the chain that is positioned in trough 37 in the direction of the lateral conveyor 11 to which the package is to be dispatched. The roller chain 32 may be driven by any convenient means and in the particular embodiment shown a V-belt 60 extends between a sheave 61 secured to the same shaft as sprocket 34 and a sheave 62 secured to the same shaft as idler sheave 58. When frame 36 is in the lowered position shown in FIGURES 2 and 14, the V-belt 60 will loosely pass over the sheaves 61 and 62 and thus roller chain 32 will not be driven. When air cylinder assembly 46 is actuated to raise frame 36 to the position shown in FIGURE 15 the center distance between sheaves 61 and 62 will be increased to provide the necessary tension in V-belt 60 to thereby drive roller chain 32 through sprocket 34. Although by this arrangement lateral conveyor 11 and dispatch device 12 are driven by the same motor 56, it will readily appear that conveyor 11 and device 12 may be driven separately if desired and may be driven either intermittently or continuously, as desired.

With chain 32 in the elevated position, as a package 5 approaches the dispatch station where it is to be removed the leading edge or portion of the package 5 will engage the blocks 48 and be urged upwardly onto such blocks by the forward motion of the main conveyor 10. The package 5 is now supported by either a line or point contact on the surface of main conveyor 10 and by either a line or point contact on the blocks 48 of dispatch device 12. Since roller chain 32 is being driven laterally with respect to main conveyor 10 the package 5 will be pivoted and the leading portion urged toward the lateral conveyor 11 as shown in progressive steps by the phantom lines in FIGURE 1. At the same time the main conveyor 10 is tending to advance the package 5 in the normal direction of movement of the conveyor and thus the package 5 is not detained relative to the movement of the main conveyor and therefore does not interfere with the normal movement of successive packages or objects on the main conveyor. It is preferred that the chain 32 of dispatch device 12 to be driven at a rate of linear advancement greater than the rate of linear advancement of the main conveyor 10 and in fact, it has been found highly satisfactory if chain 32 is driven at twice the rate of linear advancement as main conveyor 10. By this arrangement it may be seen that the package 5 is pivoted rapidly and pulled off main conveyor 10 onto lateral conveyor 11, the lateral conveyor 11 assisting in the removal of package 5 from the conveyor 10 as soon as portion of package 5 engages the driven rollers 52.

The timing between the actuation of cylinder 46 thereby elevating and driving chain 32 and the exact position of package 5 relative to dispatch device 12 has been found relatively non-critical as compared with the timing required with other types of dispatch devices. Air cylinder assembly 46 may be actuated as soon as the previous box has passed dispatch device 12. Air cylinder assembly 46 may be actuated as late as when the package 5 that is to be dispatched is positioned over dispatch device 12, as long as the center of gravity of that package 5 has not passed dispatch device 12 whereby the trailing edge rather than the leading edge of the package 5 would be lifted and pivoted laterally.

Thus, it may be seen that by this invention there is provided a conveyor and dispatch arrangement that is superior in operation, relatively simple in construction and adaptable to most types of conveyors. The timing between the main conveyor and the dispatch devices at the various stations is made appreciably easier in that a relatively wide latitude for error or variance in timing is permissible which is generally not permissible with other types of dispatch devices. Furthermore, it may be seen that regardless of the shape or configuration of the particular package or the irregularity of the bottom surface of such package or object, the dispatch device 12 will engage the leading portion of the supporting surface of that package or object and pivot same onto lateral conveyor 11 which will continue to pull the package or object off the main conveyor 10. Thus, it has been found, for example, that extremely long packages may be dispatched onto conveyor 11 that would be too long for the width of the conveyor 11 if pushed laterally onto the conveyor as is conventional with many types of devices.

Having fully described my invention, it is to be understood that I do not wish to be limited to the details herein set forth or to the details illustrated in the drawings, but my invention is of the full scope of the appended claims.

I claim:

1. In a package conveyor and lateral dispatch arrangement, the combination of: a conveyor having a narrow lateral space in the continuing conveying surface thereof, lateral dispatching means positioned in said space and selectively movable to positions above and below said conveying surface, and said dispatching means moving laterally relative to said conveyor within said space for engaging a package upon positioning said dispatching means above said conveying surface for providing the sole applied force for dispatching the package laterally off said conveyor in the direction of lateral movement of said dispatching means.

2. In a package conveyor and lateral dispatch arrangement, the combination of: a belt conveyor having a narrow lateral space in the continuing conveying surface thereof, lateral dispatching means positioned in said space and selectively movable to positions above and below said conveying surface, and said dispatching means moving laterally relative to said belt conveyor within said space upon positioning said dispatching means above said conveying surface for engaging the underside of the leading portion of a package and providing the sole applied force to pivot and move the package laterally off said belt conveyor in the direction of lateral movement of said dispatching means.

3. In a package conveyor and lateral dispatch arrangement, the combination of: a belt conveyor having a narrow lateral space in the continuing conveying surface thereof, lateral dispatching means positioned in said space and extending the width of said conveyor, said dispatching means selectively movable to positions above and below said conveying surface, tapered means on said dispatching means positioned at an acute angle to said conveying surface relative to the direction of movement of said conveying surface for causing a package moving on said belt conveyor to be urged up on to said tapered means, and said dispatching means moving laterally relative to said belt conveyor within said space for engaging the underside of a package upon positioning said dispatching means above said conveying surface to move the package laterally off said belt conveyor in the direction of lateral movement of said dispatching means.

4. In a package conveyor and lateral dispatch arrangement, the combination of: a belt conveyor having a narrow lateral space in the continuing conveying surface thereof, lateral dispatching means positioned in said space and extending the width of said conveyor, said dispatching means selectively movable to positions above and below said conveying surface, tapered means on said dispatching means positioned at an acute angle to said conveying surface relative to the direction of movement of said conveying surface for causing a package moving on said belt conveyor to be urged up on to said tapered means, said tapered means having portions above and below said conveying surface when said dispatching means is in the said position above the conveying surface, and said dispatching means moving laterally relative to said belt conveyor within said space upon positioning said dispatching means above said conveying surface to engage underside of the leading portion of a package to pivot and move the package laterally off said belt conveyor in the direction of lateral movement of said dispatching means.

5. In a package conveyor and lateral dispatch arrangement, the combination of: a main conveyor having a plurality of individual continuous conveyor belts longitudinally aligned in series in the direction of movement of the main conveyor, each said conveyor belt having an upper conveying surface aligned with the conveying surface of the next adjacent conveyor belt, each conveyor belt longitudinally spaced a small distance from the next adjacent conveyor belt for defining a narrow lateral space in the conveying surface of said main conveyor, means for driving said conveyor belts at the same rate of linear movement, lateral dispatching means positioned in said space and selectively movable to positions above and below said conveying surface, and said dispatching means moving laterally relative to said belt conveyor within said space upon positioning said dispatching means above said conveying surface for engaging the underside of the leading portion of a package and providing the sole applied force to pivot and move the package laterally off said belt conveyor in the direction of lateral movement of said dispatching means.

6. In a package conveyor and lateral dispatch arrangement, the combination of: a main conveyor having a plurality of individual continuous conveyor belts longitudinally aligned in series in the direction of movement of the main conveyor, each said conveyor belt having an upper conveying surface aligned with the conveying surface of the next adjacent conveyor belt, each conveyor belt longitudinally spaced a small distance from the next adjacent conveyor belt for defining a narrow lateral space in the conveying surface of said main conveyor, a pair of parallel rollers associated with each said conveyor belt, means urging said pair of rollers toward each other, the lower return portion of each said conveyor belt passing between a said pair of rollers, a continuous belt positioned below said plurality of conveyor belts and passing between each said pair of rollers in frictional contact with each said conveyor belt, means for driving said driving belt whereby all said conveyor belts are driven at the same rate of linear movement, lateral dispatching means positioned in said space and selectively movable to positions above and below said conveying surface, and said dispatching means moving laterally relative to said belt conveyor with said space upon positioning said dispatching means above said conveying surface to engage underside of the leading portion of a package to pivot and move the package laterally off said belt conveyor in the direction of lateral movement of said dispatching means.

7. In a package conveyor and lateral dispatch arrangement, the combination of: a belt conveyor having a narrow lateral space in the conveying surface thereof, lateral dispatching means having a continuous element with a portion of said element positioned in said space and extending substantially the width of said belt conveyor, said portion of said element being substantially parallel to said conveying surface, tapered means on said element positioned at an acute angle to said conveying surface relative to the direction of movement of the said belt conveyor, means for driving said continuous element for moving the said portion of said element laterally relative to the direction of movement of said belt conveyor, and means for selectively moving said portion of said element above and below said conveying surface for causing said tapered means to engage a package upon said movement above the conveying surface to move said package laterally off of said belt conveyor.

8. In a package conveyor and lateral dispatch arrangement, the combination of: a belt conveyor having a narrow lateral space in the conveying surface thereof, lateral dispatching means having a continuous element with a portion of said element positioned in said space and extending substantially the width of said belt conveyor, said portion of said element being substantially parallel to said conveying surface, tapered means on said element positioned at an acute angle to said conveying surface relative to the direction of movement of the said belt conveyor, means for driving said continuous element for moving the said portion of said element laterally relative to the direction of movement of said belt conveyor, means for selectively moving said portion of said element above and below said conveying surface for causing said tapered means to engage a package upon said movement above the conveying surface to move said package laterally off of said belt conveyor, and a power driven lateral conveyor positioned adjacent said belt conveyor at the location of said lateral dispatching means for receiving and engaging the package moved laterally by said dispatching means for moving that package away from said belt conveyor.

9. In a package conveyor and lateral dispatch arrangement, the combination of: a belt conveyor having a narrow lateral space in the conveying surface thereof, lateral dispatching means having a continuous element with a portion of said element positioned in said space and extending substantially the width of said belt conveyor, said portion of said element being substantially parallel to said conveying surface, tapered means on said element positioned at an acute angle to said conveying surface relative to the direction of movement of the said belt conveyor, means for driving said continuous element for moving the said portion of said element laterally relative to the direction of movement of said belt conveyor, and means for selectively moving said portion of said element above and below said conveying surface for causing said tapered means to engage a package upon said movement above the conveying surface to move said package laterally off of said belt conveyor, said portion of said element moving laterally at a rate of linear movement greater than the rate of linear movement of said web.

10. In a package conveyor and lateral dispatch arrangement, the combination of: a main conveyor having a moving web positioned relatively horizontal and defining a package conveying surface on the upper side of said web, said web extending below said conveying surface for a short distance in the direction of movement of said web and defining a narrow horizontal space in the conveying surface laterally across the entire main conveyor, lateral dispatching means having a continuous element with a portion of said element positioned in said space and extending substantially the width of said main conveyor, said portion of said element being substantially parallel to said conveying surface, tapered means on said element positioned at an acute angle to said conveying surface relative to the direction of movement of the said web, means for driving said continuous element for moving the said portion of said element laterally relative to the direction of movement of said web, means for selectively moving said portion of said element above and below said conveying surface for causing said tapered means to engage a package upon said movement above the conveying surface to move said package laterally off of said main conveyor, said portion of said element moving laterally at a rate of linear movement greater than the rate of linear movement of said web, and a lateral conveyor positioned adjacent said main conveyor at the location of said lateral dispatching means for receiving the package moved laterally by said dispatching means.

11. In a package conveyor and lateral dispatch arrangement, the combination of: a main conveyor having a moving web positioned relatively horizontal and defining a package conveying surface on the upper side of said web, said web extending below said conveying surface for a short distance in the direction of movement of said web and defining a narrow horizontal space in the conveying surface laterally across the entire main conveyor, lateral dispatching means having a continuous roller chain mounted on a movable frame with a portion of said chain positioned in said space and extending substantially the width of said main conveyor, said portion of chain being substantially parallel to said conveying surface, tapered blocks mounted on said chain positioned at an acute angle to said conveyor surface relative to the direction of movement of the said web, means for driving said roller chain for moving the said portion of chain laterally relative to direction of movement of said web, and means for selectively moving said chain supporting frame vertically with said portion of chain above or below said conveying surface for causing said tapered means to engage a package upon said movement above the conveying surface, said portion of said element moving laterally at a rate of linear movement approximately twice the rate of linear movement of said web whereby engaging a package causes rapid pivoting movement of the package while the package advances along the main conveyor and simultaneously moves the package off the main conveyor.

12. In a package conveyor and lateral dispatch arrangement, the combination of: a main conveyor having a plurality of individual continuous conveyor belts longitudinally aligned in series in the direction of movement of the main conveyor, each said conveyor belt having an upper conveying surface aligned with the conveying surface of the next adjacent conveyor belt, each conveyor belt longitudinally spaced a small distance from the next adjacent conveyor belt for defining a narrow lateral space in the conveying surface of said main conveyor, means for driving said conveyor belts at the same rate of linear movement, lateral dispatching means having a continuous element with a portion of said element positioned in said space and extending substantially the width of said main conveyor, said portion of said element being substantially parallel to said conveying surface, tapered means on said element positioned at an acute angle to said conveying surface relative to the direction of movement of the said web, means for driving said continuous element for moving the said portion of said element laterally relative to the direction of movement of said web, means for selectively moving said portion of said element above and below said conveying surface for causing said tapered means to engage a package upon said movement above the conveying surface to move said package laterally off of said main conveyor, and said portion of said element moving laterally at a rate of linear movement greater than the rate of linear movement of said web.

13. In a package conveyor and lateral dispatch arrangement, the combination of: a main conveyor having a plurality of individual continuous conveyor belts longitudinally aligned in series in the direction of movement of the main conveyor, each said conveyor belt having an upper conveying surface aligned with the conveying surface of the next adjacent conveyor belt, each conveyor belt longitudinally spaced a small distance from the next adjacent conveyor belt for defining a narrow lateral space in the conveying surface of said main conveyor, a pair of parallel rollers associated with each said conveyor belt, means urging said pair of rollers toward each other, the lower return portion of each said conveyor belt passing between a said pair of rollers, a continuous driving belt positioned below said plurality of conveyor belts and passing between each said pair of rollers in frictional contact with each said conveyor belt, means for driving said driving belt whereby all said conveyor belts are driven at the same rate of linear movement, lateral dispatching means having a continuous element with a portion of said element positioned in said space and extending substantially the width of said main conveyor, said portion of said element being substantially parallel to said conveying surface, tapered means on said element positioned at an acute angle to said conveying surface relative to the direction of movement of the said web, means for driving said continuous element for moving the said portion of said element laterally relative to the direction of movement of said web, means for selectively moving said portion of said element above and below said conveying surface for causing said tapered means to engage a package upon said movement above the conveying surface to move said package laterally off of said main conveyor, and said portion of said element moving laterally at a rate of linear movement greater than the rate of linear movement of said web.

14. In a package conveyor and lateral dispatch arrangement, the combination of: a belt conveyor having a narrow lateral space in the continuing conveying surface thereof, lateral dispatching means positioned in said space and selectively movable to positions above and below said conveying surface, and said dispatching means moving laterally relative to said belt conveyor within said space for engaging a package upon positioning said dispatching means above said conveying surface for providing the sole applied force to move the package laterally off said belt conveyor in the direction of lateral movement of said dispatching means, said dispatching means moving laterally at a rate of linear movement greater than the rate of linear movement of said belt conveyor.

15. In a package conveyor and lateral dispatch arrangement, the combination of: a belt conveyor having a narrow lateral space in the continuing conveying surface thereof, lateral dispatching means positioned in said space and selectively movable to positions above and below said conveying surface, and said dispatching means moving laterally relative to said belt conveyor within said space for engaging a package upon positioning said dispatching means above said conveying surface for providing the sole applied force to move the package laterally off said belt conveyor in the direction of lateral movement of said dispatching means, said dispatching means moving laterally at a rate of linear movement approximately twice the rate of linear movement of said belt conveyor whereby the package engaged by said dispatching means is rapidly pivoted while moved laterally.

16. In a package conveyor and lateral dispatch arrangement, the combination of: a main conveyor having a plurality of individual continuous conveyor belts longitudinally aligned in series in the direction of movement of the main conveyor, each said conveyor belt having an upper conveying surface aligned with the conveying surface of the next adjacent conveyor belt, each conveyor belt longitudinally spaced a small distance from the next adjacent conveyor belt for defining a narrow lateral space in the conveying surface of said main conveyor, a pair of parallel rollers associated with each said conveyor belt, means urging said pair of rollers toward each other, the lower return portion of each said conveyor belt passing between a said pair of rollers, a continuous belt positioned below said plurality of conveyor belts and passing between each said pair of rollers in frictional contact with each said conveyor belt, means for driving said continuous belt whereby all of said conveyor belts are driven at the same rate of linear movement, and lateral dispatching means positioned in each said space and having means selectively operable for engaging a package moving along the said conveying surface and laterally dispatching that package off the said conveying surface.

17. In a package conveyor and lateral dispatch arrangement, the combination of: a conveyor having a narrow lateral space in the continuing conveying surface thereof, lateral dispatching means positioned in said space and selectively movable to positions above and below said conveying surface, said dispatching means moving laterally relative to said conveyor within said space for engaging a package upon positioning said dispatching means above said conveying surface for providing the sole applied force for laterally dispatching the package off said conveyor in the direction of said lateral movement, and a power-driven lateral conveyor positioned adjacent the first-mentioned conveyor at the location of said lateral dispatching means for receiving and engaging the package moved laterally by said dispatching means for moving that package away from said first-mentioned conveyor, said lateral conveyor having a predetermined width extending along said first-mentioned conveyor with a substantially greater proportion of said width positioned in the upstream direction from said lateral dispatching means.

References Cited by the Examiner

UNITED STATES PATENTS

| 2,362,079 | 11/44 | McCann | 198—81 |
| 2,856,055 | 10/58 | Moss | 198—20 |
| 3,051,289 | 8/62 | Horsford | 198—20 |

FOREIGN PATENTS 489,627  1/30  Germany.

SAMUEL F. COLEMAN, *Primary Examiner.*

WILLIAM B. LA BORDE, *Examiner.*